US008305378B2

(12) United States Patent
Borac

(10) Patent No.: US 8,305,378 B2
(45) Date of Patent: Nov. 6, 2012

(54) METHOD AND APPARATUS FOR APPROXIMATING HAIR AND SIMILAR OBJECTS DURING ANIMATION

(75) Inventor: Silviu Borac, Pacifica, CA (US)

(73) Assignee: Pacific Data Images LLC, Redwood City, CA (US)

( * ) Notice: Subject to any disclaimer, the term of this patent is extended or adjusted under 35 U.S.C. 154(b) by 1030 days.

(21) Appl. No.: 12/196,172

(22) Filed: Aug. 21, 2008

(65) Prior Publication Data

US 2010/0045679 A1    Feb. 25, 2010

(51) Int. Cl.
*G06T 11/20* (2006.01)
(52) U.S. Cl. ......................................... 345/442
(58) Field of Classification Search .................. None
See application file for complete search history.

(56) References Cited

U.S. PATENT DOCUMENTS

| | | | | |
|---|---|---|---|---|
| 4,620,287 A * | 10/1986 | Yam | | 345/442 |
| 5,133,052 A * | 7/1992 | Bier et al. | | 715/234 |
| 5,261,033 A * | 11/1993 | Oka | | 345/442 |
| 6,097,396 A * | 8/2000 | Rouet et al. | | 345/582 |
| 6,268,846 B1 * | 7/2001 | Georgiev | | 345/419 |
| 6,366,927 B1 * | 4/2002 | Meek et al. | | 345/442 |
| 6,559,849 B1 * | 5/2003 | Anderson et al. | | 345/474 |
| 6,587,745 B1 * | 7/2003 | Polden et al. | | 700/138 |
| 6,903,742 B1 * | 6/2005 | Fushiki et al. | | 345/443 |
| 6,904,151 B2 * | 6/2005 | Deguillaume et al. | | 382/100 |
| 7,496,416 B2 * | 2/2009 | Ferguson et al. | | 700/83 |
| 2009/0027398 A1 * | 1/2009 | Frisken | | 345/442 |
| 2009/0040218 A1 * | 2/2009 | Museth et al. | | 345/420 |

OTHER PUBLICATIONS

Stone, Approximation of Curves by Line Segments, Jan. 1961, Mathematics of Computation, vol. 15, No. 73, pp. 40-47.*
Cantoni, Optimal Curve Fitting with Piecewise Linear Functions, Jan. 1971, IEEE Transactions on Computers, vol. C20, No. 1, pp. 59-67.*
Seidel, Polar Forms for Geometrically Continuous Spline Curves of Arbitrary Degree, Jan. 1993, ACM Transactions on Graphics, vol. 12, No. 1, pp. 1-34.*
Daldegan et al., An Integrated System for Modeling, Animating and Rendering Hair, 1993, Computer Graphics Forum, pp. 211-221.*
Stoer et al., "Introduction to Numerical Analysis", 3rd edition, Texts in Applied Mathematics, vol. 12, Springer, Aug. 2002, 9 pages.
Farin et al., "Curves and Surfaces for Computer Aided Geometric Design", 4th edition, Academic Press, Inc., Sep.-Oct. 1996, 15 pages.

* cited by examiner

*Primary Examiner* — Ulka Chauhan
*Assistant Examiner* — Anh-Tuan V Nguyen
(74) *Attorney, Agent, or Firm* — Morrison & Foerster LLP

(57) ABSTRACT

Simulating dynamics (e.g., physical effects of inertia, forces, wind) on strands (e.g., hair) during computer based animation requires quick and accurate approximations of mathematical curves. Each strand is initially represented as a B-spline curve. Line segments approximating the curve are created by using affine combinations based on the curve's control vertices. Dynamics simulation is performed on the line segment approximation. Once an approximated strand is simulated, it is converted back into a B-spine curve representation for downstream processes, such as rendering. The rendering process displays the simulated strand to the animator.

18 Claims, 10 Drawing Sheets

METHOD AND APPARATUS FOR APPROXIMATING HAIR AND SIMILAR OBJECTS DURING ANIMATION

FIELD OF INVENTION

This disclosure is directed to simulating the motion of thin and long objects ("strands" as such hair) in the field of computer graphics, and specifically for approximating strands for computer enabled animation.

BACKGROUND OF INVENTION

Media productions employ increasingly complex computer enabled animations to produce realistic images. Examples of strands that improve an animation's realism include depictions of long hair, wavy or curly hair, braids, animal ears, tails, foliage, and jewelry.

Strands are typically represented in animation by curves. Because computer graphics generated curves are computer resource intensive to animate, it is desirable to approximate curves during parts of the animation process to reduce computer processing time and memory requirements.

FIG. 1A shows graphically one known method of using line segments to approximate a computer generated curve 102 that relies on the curve's control vertices 106. Line segments 104 are drawn between each pair of successive control vertices 106 (except between the curve's endpoints) to create a chain of line segments that approximates the curve. This method involves simple identification of control vertices, but results in approximations having line segments that are consistently longer than the respective portions of the original curve they approximate. Thus, the approximations are undesirably consistently larger (longer) than the originals.

FIG. 1B shows another method of approximation that uses a curve's segment endpoints 108. Line segments 104 are drawn between each pair of successive segment endpoints 108 (except between the curve's endpoints) to create an approximation. Approximations created in this way have line segments that are consistently shorter than their respective portions of the original curve 102. Thus, the approximations are undesirably consistently smaller (shorter) than the originals.

SUMMARY

The viability of animating strands using approximations depends on a computer enabled animation system's ability to approximate accurately and quickly. The present approach produces line segments that approximate strands represented by B-spline curves, and vice versa, accurately and quickly to support computer enabled animation processes.

Computer enabled animation systems consist of multiple parts. In some parts of the system, it is desirable to operate on strands that are represented by B-spline curves because of curves' mathematical properties. In other parts of the system, it is desirable to operate on line segment approximations of strands because line segments improve efficiency.

In one embodiment, a conventional part of the animation system, called a dynamics simulator, operates on line segment approximations of strands. The present approach can function with different dynamics simulators. U.S. patent application publication number 2009/0091575 A1, incorporated herein by reference in its entirety, discloses a relevant dynamics simulator. The present approach can also function with conventional commercial animation software such as Autodesk® Maya®.

Other parts of the animation system upstream and downstream from the dynamics simulator, however, operate on B-spine curve representation of strands. For instance, another conventional part of the animation system, called a rendering module, operates on B-spine curve representations of strands. Rendering may also be carried out in different ways. The present approach functions with DreamWorks Animation's proprietary "EMO" and "RIG" animation tools.

The present method and apparatus produces line segment approximations of strands represented by curves. The present approach also produces curved representations of line segment approximations after the strand approximations have been simulated. This has the advantage of producing approximations accurately and quickly to enable animation.

One skilled in the art will recognize that the present approach may be implemented in various parts of a computer enabled animation system, including but not limited to dynamics simulators, and that strands may be depicted in two, or three dimensions.

DETAILED DESCRIPTION OF THE INVENTION

Figure 9:
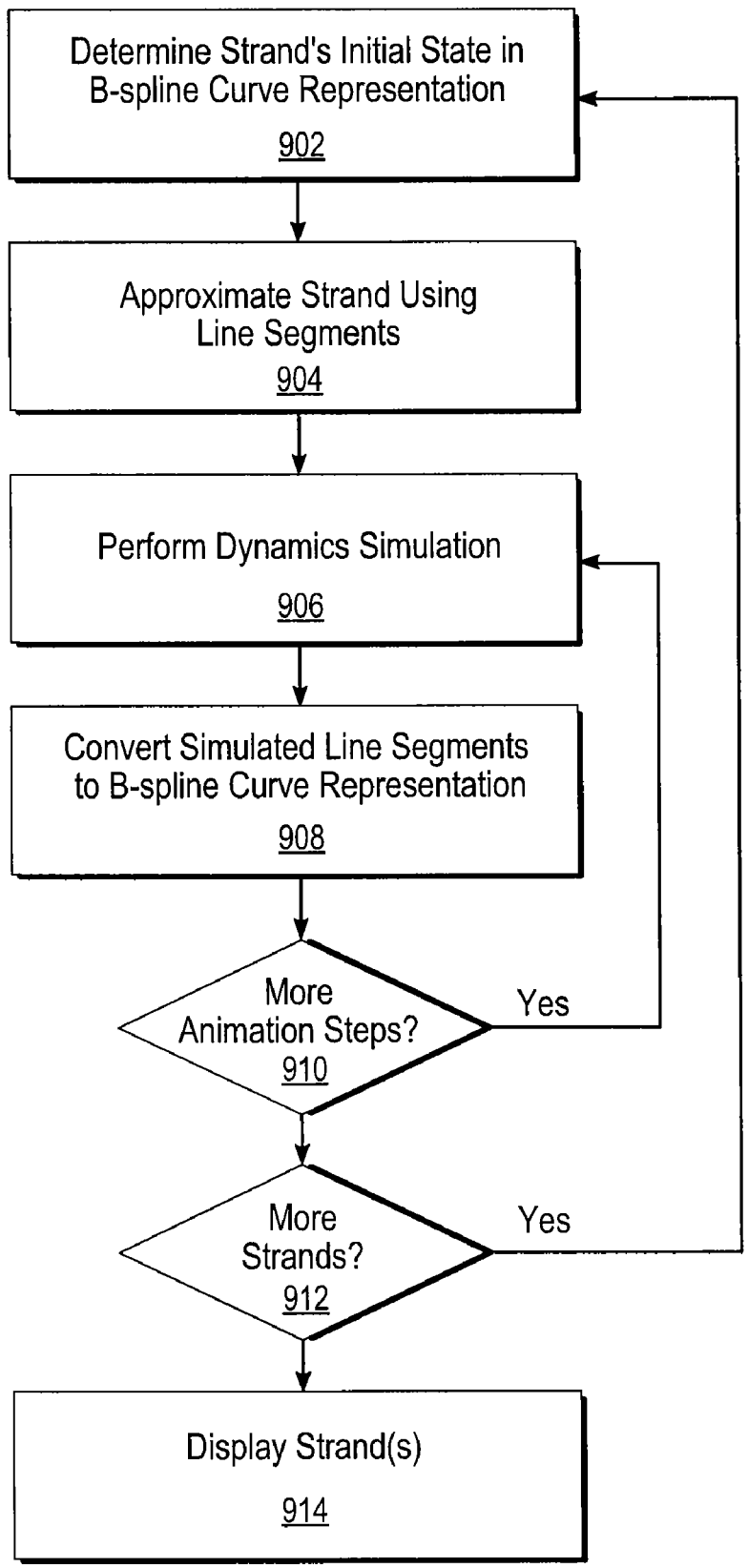
FIG. 9 is a flowchart representing the current method and apparatus.

FIG. 9 shows the data flow of one embodiment of a computer programmed to carry out the present method. In function or module 902, a strand's initial state in B-spline curve representation is retrieved from information stored in another part of the animation system. If a strand is not readily represented as a B-spline curve, a curve is created for the strand. Using the approach to be described below, the computer enabled animation system determines a line segment approximation to the B-spline curve representation of the stand 904. Dynamics simulation occurs in function 906. The simulated strand, represented by line segments, is converted back to B-spline curve representation for further downstream processing at 908. Functions 906 and 908 repeat as necessary to simulate additional animation steps for a strand (910). The flow may be repeated for additional strands at 912. When all animation steps for all strands have been processed, the strands are displayed to the animator at 914.

In one embodiment, each strand is represented by one endpoint interpolating cubic uniform B-spline curve (hereafter "B-spline curve"). In general, let N denote the number of control vertices in a B-spline curve. Endpoint interpolating cubic B-spline curves are controlled by at least four control vertices (i.e., $N \geq 4$). A uniform B-spline curve is one where the intervals between successive control vertices are equal.

Figure 2:
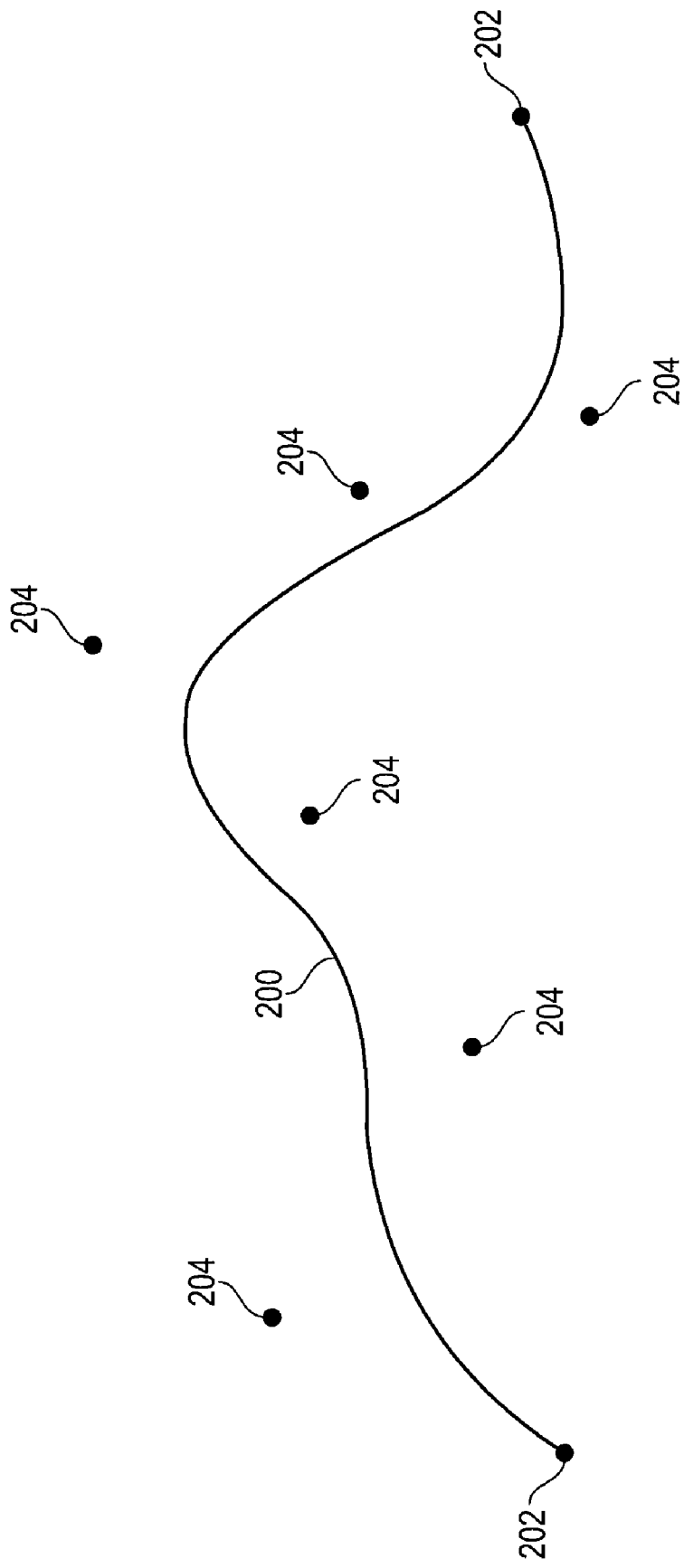
FIG. 2 shows a B-spline curve with multiple control vertices.

Let $C_k$ denote control vertices of a B-spline curve indexed by k. For example, the control vertices of a curve having six control vertices (N=6) may be denoted as $C_0 \ldots C_5$, or, $C_k$ where $0 \leq k \leq N-1$. FIG. 2 shows a B-spline curve 200 having eight control vertices 202-204. Control vertices 202 also represent endpoints of the curve 200. The present method uses three-point affine combinations to create line segments approximating a strand. In general, a n-point affine combination of points $X_1 \ldots X_n$ is defined as the point:

$$\sum_{i=1}^{n} \alpha_i X_i \qquad (1)$$

where $$\sum_{i=1}^{n} \alpha_i = 1$$

In the present approach, control vertices of a B-spline curve are treated as points in affine space. Affine combinations require that the coefficients of affine points in the combination sum up to one. Thus, a three-point affine combination ($A_k$) of B-spline control vertices ($C_k$) is defined as:

$$A_k = \alpha_k C_k + \alpha_{k-1} C_{k-1} + \alpha_{k+1} C_{k+1}$$

where $\alpha_k + \alpha_{k-1} + a_{k+1} = 1$ \qquad (2)

A section of a curve is approximated based on whether it is at, near, or away from the curve's endpoints. Three-point affine combinations $A_k$ are considered "away" from a curve's endpoints where $3 \leq k \leq N-4$. Three-point affine combinations $A_k$ are considered "at or near" a curve's endpoints where ($0 \leq k < 3$ or $N-4 < k < N$). Three-point affine combinations $A_k$ for B-spline curves having four or five control vertices (N=4 or N=5) are given special consideration. Approximations "away" from endpoints are discussed first. Approximations "at or near" endpoints are discussed subsequently. Finally, curves of special symmetry are discussed.

Figure 3:
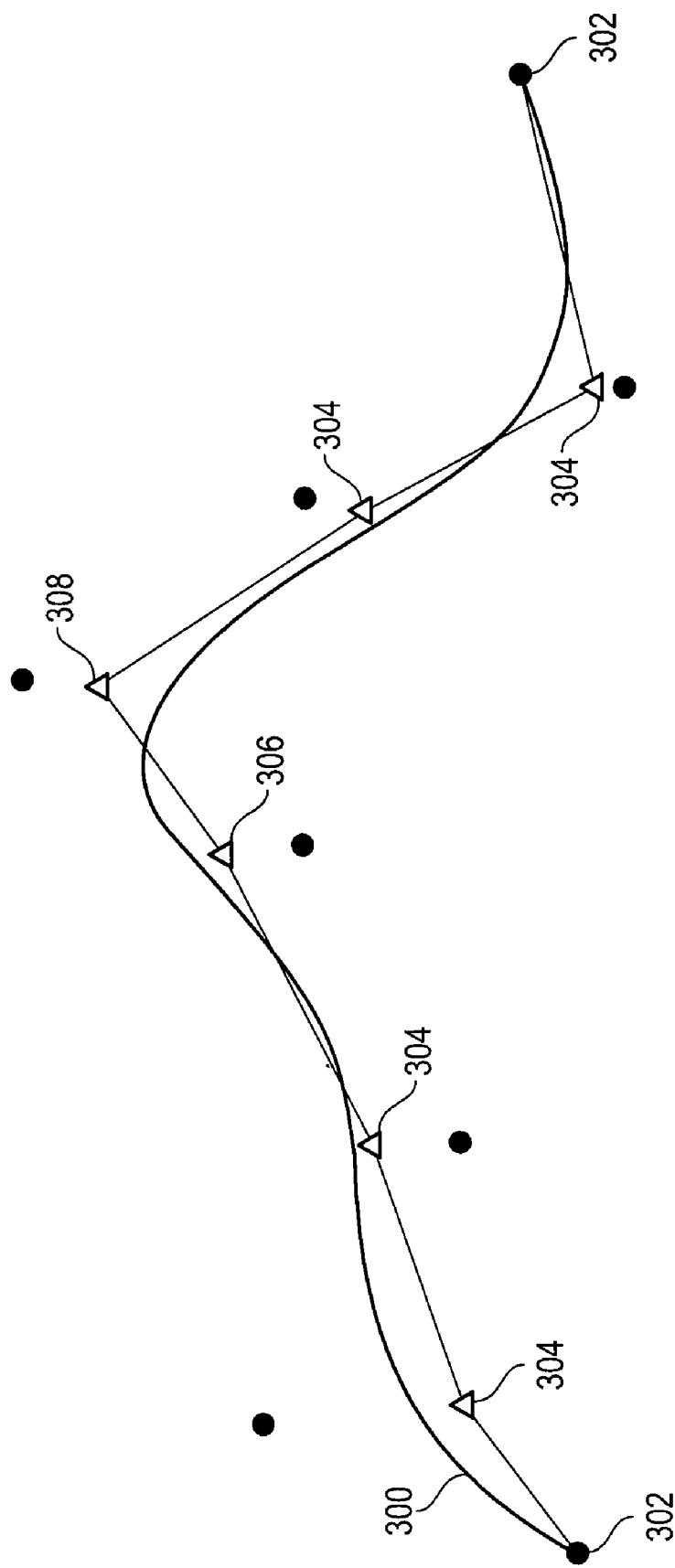
FIG. 3 shows the present method.

Approximations away from endpoints are discussed first. Three-point affine combinations $A_k$ are considered away from a curve's endpoints where $3 \leq k \leq N-4$, N>5. FIG. 3 shows B-spline curve 300 with eight control vertices (N=8). Affine combinations 306 and 308 are away from endpoints 302.

An approximation's geometry should not change if the sequence of control vertices is reversed. In other words, an approximation calculated from the perspective of control vertices sequence of C0, C1, ... CN−1 should be the same as an approximation calculated from the perspective of sequence CN−1, CN−2, ... C0. This is because the same potion of the curve is being approximated; only the perspective of control vertices has been reversed. Consequently, for affine combinations away from the endpoints, equation (2) is simplified by applying equal weight to control vertices adjacent to $C_k$ (i.e., $C_{k-1}$ and $C_{k+1}$) so that the affine combination is symmetric. Because $\alpha_{k-1} = \alpha_{k+1}$, equation (2) simplifies into:

$$A_k = \alpha C_k + \frac{1-\alpha}{2}(C_{k-1} + C_{k+1}) \qquad (3)$$

where $3 \leq k \leq N-4$ and $N > 5$

Equation (3) calculates affine combinations ($A_k$) away from a B-spline curve's endpoints. $C_{k-1}$, $C_k$, $C_{k+1}$ is a sequence of three successive control points of the B-spline curve. In FIG. 3, affine combinations 306 and 308 may be calculated using Equation (3).

Affine combinations are used as line segment vertices of the line segment approximation. Once each affine combination ($A_k$) away from a B-spline curve's endpoints is determined, each pair of successive affine combinations (i.e., $A_k$ and $A_{k+1}$) is connected with a line segment. FIG. 3 shows line segment 340 connecting successive affine combinations 306 and 308. In this way, a chain of line segments approximating portions of the B-spline curve 300 away from its endpoints is determined.

One skilled in the art will recognize that strands may be represented mathematically by different types of curves with different numbers of control vertices (i.e., N), and that affine combinations of different orders (i.e., n) may be used. For example, it is also possible to represent strands using free-end B-spline curves, Catmull-Rom spline curves, or Parabolic spline curves. One skilled in the art will thus be able to apply the present method on various types of curves, with different numbers of control vertices and affine combinations, including but not limited to the examples described above.

Equation (3) provides a family of resulting affine combinations for different values of parameter "α." Of these resulting affine combinations, some are better approximations than others. It is desirable to determine α such that line segments connecting affine combinations most closely approximates their respective portions of the curve ("arcs"). It is also desirable to determine α independently of any particular curve, such that a general equation may be derived to approximate any B-spline curve accurately.

Figure 4:
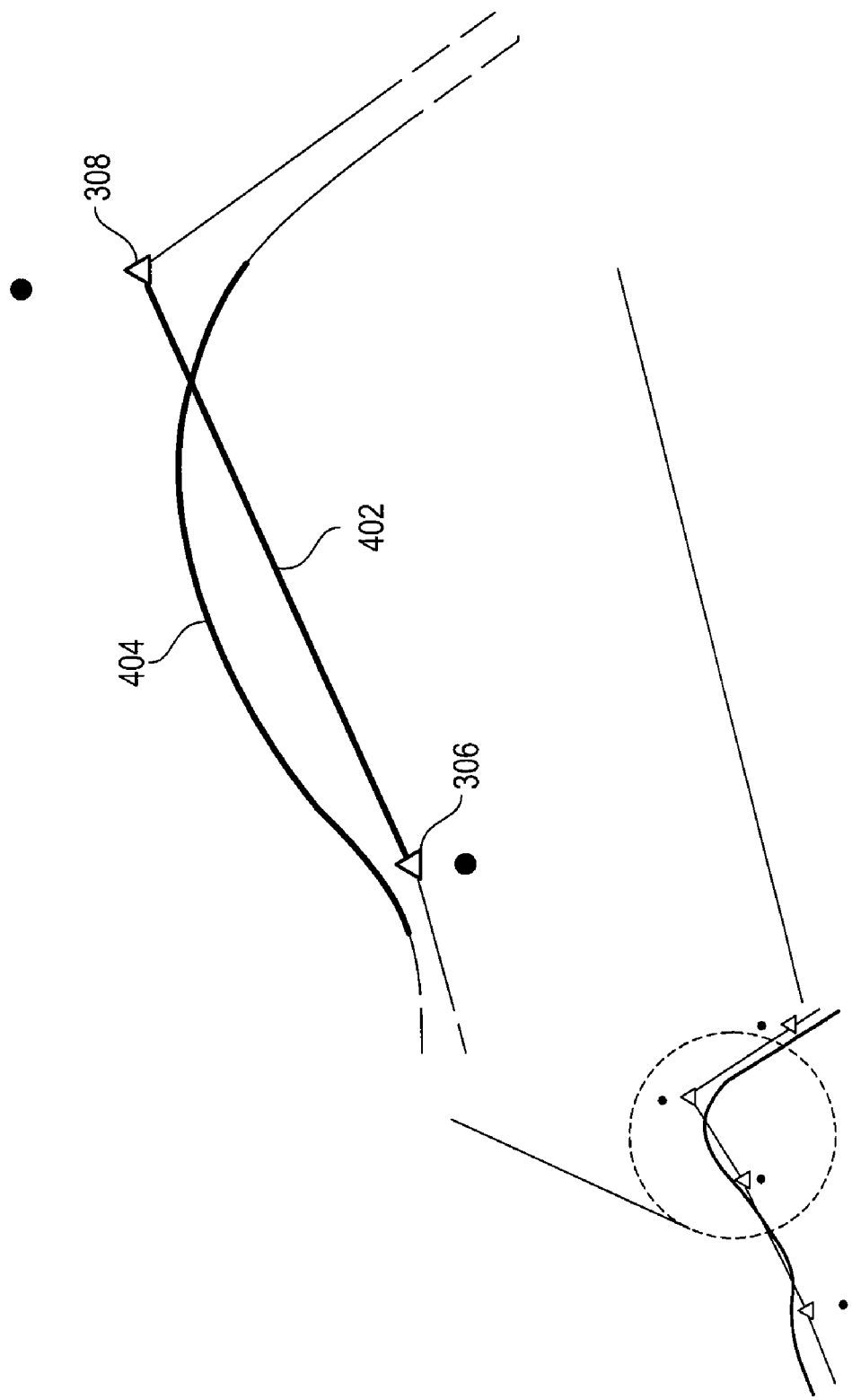
FIG. 4 shows line segments approximately equal in length to curve segments.

FIG. 4 shows line segment 402 (connecting affine combinations 306 and 308) approximating curve segment 404. One skilled in the art will recognize that the quality of the approximation in FIG. 4 will improve if: 1) more line segments are used so as to decrease the length of each line segment in the approximation and the respective arc being approximated, and 2) the length of each line segment becomes more equal to the length of arc being approximated.

Figure 5:
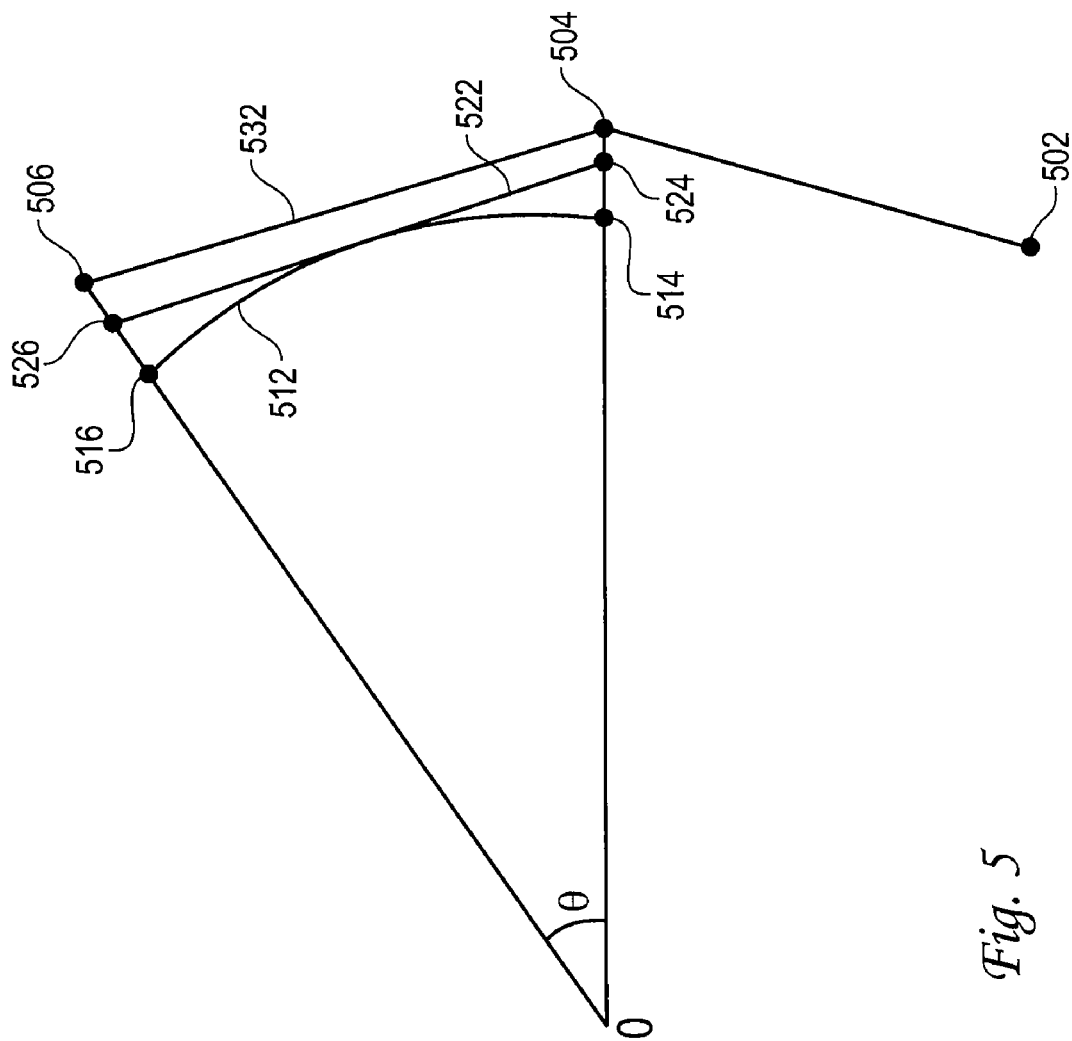
FIG. 5 shows the optimized approximation of a B-spline curve segment.

The present approach allows the value of α to vary. Thus, it is desirable to determine an optimized value of α, such that a line segment (e.g., 402) and the arc (e.g., 404) it approximates are approximately equal in length. FIG. 5 shows various considerations in determining an optimized value for α. B-spline curve 512 has control vertices 502-506 on a circle of radius 1. B-spline curve 512 has curve segment endpoints 514 and 516 on a circle of radius R. R is a function of θ:

$$R = \frac{2}{3} + \frac{1}{3}\cos\theta \qquad (4)$$

The length of an arc of radius 1 connecting arc endpoints 514 and 516 is:

Length=Rθ \qquad (5)

Affine combinations 524 and 526 are on a circle of radius $R_A$:

$R_A = \alpha + (1-\alpha)\cos\theta$ \qquad (6)

The length of a line segment 522 connecting affine combinations 524 and 526 is:

$$Length_A = 2R_A \sin\left(\frac{\theta}{2}\right) \quad (7)$$

The goal is to derive α such that the length of line segment 522 (equation 7) is as equal as possible to the length of the B-spline curve segment 512 (equation 5):

$$2R_A \sin\frac{\theta}{2} = R\theta \quad (8)$$

$$\alpha = \frac{1}{1 - \cos\theta}\left(\frac{\left(\frac{2}{3} + \frac{1}{3}\cos\theta\right)\theta}{2\sin\left(\frac{\theta}{2}\right)} - \cos\theta\right) \quad (9)$$

One skilled in the art will recognize that line segment 522 and arc 512 become closer in length as angle θ is reduced. Therefore, it is desirable to determine if a finite, well defined value exists for α as θ approaches zero:

$$\alpha = \lim_{\theta \to 0} \frac{1}{1 - \cos\theta}\left(\frac{\left(\frac{2}{3} + \frac{1}{3}\cos\theta\right)\theta}{2\sin\left(\frac{\theta}{2}\right)} - \cos\theta\right) \quad (10)$$

$$\alpha = \frac{3}{4}$$

A value of α=¾ exists as θ approaches zero. Using this value, line segments (e.g., 522) that are approximately equal in length to the arcs (e.g., 512) being approximated may be calculated. Applying α=¾ to equation (3) yields a general equation for approximating B-spline curve segments with line segments of approximately equal length:

$$A_k = \frac{3}{4}C_k + \frac{1}{8}(C_{k-1} + C_{k+1}) \quad (11)$$

where $$3 \leq k \leq N - 4 \text{ and } N > 5$$

Approximations at or near curve endpoints are now discussed. Three-point affine combinations $A_k$ are considered at or near a curve's endpoints where (0<k<3 or N−4<k<N). In FIG. 3, affine combinations 304 are near the curve's 300 endpoints 302.

FIG. 5 shows various considerations in approximating near endpoints. At an endpoint 502 of a curve, the endpoint itself 502 is used as a line segment vertex. This ensures that the approximation begins and ends at the same locations as the original curve:

$$A_0 = C_0 \quad (12)$$

An end-point interpolating cubic uniform B-spline curve with control vertices $C_0$, $C_1$, and $C_2$ (602, 604, 606) shares the same arc 600 with a free-end cubic uniform B-spline curve with successive control vertices $C'_0$, $C_2$, and $C_3$ (618, 606, 608). Given this characteristic, control vertex $C_0$ (618) may be described as a function of control vertices $C_1$ (604), and $C_2$ (606).

In general, the knot sequence of an endpoint-interpolating uniform B-spline curve is:

$$\{u_0, u_1, u_2, u_3, u_4, \ldots\} = \{0, 0, 0, 1, 2, \ldots\} \quad (13)$$

Control vertices correspond to parameter values known as Greville abscissas which are obtained from knots using the formula:

$$\xi_i = \frac{1}{3}(u_{i-1} + u_i + u_{i+1}) \quad (14)$$

Applying equation (14) to knot sequences (13), the following sequence of Greville abscissas is obtained:

$$\{\xi_1, \xi_2, \xi_3, \ldots\} = \left\{0, \frac{1}{3}, 1, \ldots\right\} \quad (15)$$

Relationships between Greville abscissas and B-spline curve control vertices are explored in knot insertion algorithms; see G. Farin, *Curves and Surfaces for Computer Aided Geometric Design*, (Academic Press, 1997): 143-147. The relationship allows $C_1$ to be written as a function of Greville abscissas and control vertices:

$$C_1 = (\xi_3 - \xi_2)C'_0 + (\xi_2 - \xi_1)C_2 \quad (16)$$

$$C_1 = \frac{2}{3}C'_0 + \frac{1}{3}C_2$$

And $C'_0$ (618) may be derived:

$$C'_0 = \frac{3}{2}\left(C_1 - \frac{1}{3}C_2\right) \quad (17)$$

The affine combination $A_2$ (654) is obtained by combining equation (17) with equation (11):

$$A_2 = \frac{3}{4}C_2 + \frac{1}{8}(C'_0 + C_3) \quad (18)$$

$$A_2 = \frac{3}{4}C_2 + \frac{1}{8}\left[\left(\frac{3}{2}\left(C_1 - \frac{1}{3}C_2\right)\right) + C_3\right]$$

$$A_2 = \frac{3}{16}C_1 + \frac{11}{16}C_2 + \frac{1}{8}C_3$$

In determining $A_1$, it is noted that the optimized value of α previously calculated (and used by equation (11)) is not applicable near the endpoints of a curve. The general equation form of an affine combination is used again to determine A1. Here, the weight corresponding to $C_0$ is twice that of the weight corresponding to $C_2$. This is in proportion to the intervals separating the corresponding Greville abscissas (14).

$$A_1 = 2\alpha_1 C_0 + (1 - 3\alpha_1)C_1 + \alpha_1 C_2 \quad (19)$$

where $$0 \leq \alpha_1 \leq \frac{1}{3}$$

The affine combination $A_1$ is well defined as long as coefficient $\alpha_1$ is chosen such that all three coefficients of the affine combination are non-zero, positive, and add up to 1. In other words, $$0 \leq \alpha_1 \leq \frac{1}{3}.$$

A new optimized value $\alpha_1$ is determined by equating the length of arc 600 with the lengths of the two line segments 656 and 658. Using the same approach shown by equations (4)-(10), a well defined value of $\alpha_1=0.172$ is found as $\theta$ approaches zero.

One skilled in the art will recognize that as long as $$0 \leq \alpha_1 \leq \frac{1}{3},$$

a computer enabled animation system performing floating point calculations will be able to carry out equation (19) whether $\alpha_1$ equals $$0.172, \frac{1}{6},$$

or 0.167. For subsequent discussion, an approximated value of $$\alpha_1 = \frac{1}{6}$$

is used to describe the present approach more easily.

$$A_1 = \frac{1}{3}C_0 + \frac{1}{2}C_1 + \frac{1}{6}C_2 \qquad (20)$$

In summary, we obtain the following affine combinations for approximation at or near the endpoints of a curve:

$$A_0 = C_0 \qquad (12, \text{repeated})$$

$$A_1 = \frac{1}{3}C_0 + \frac{1}{2}C_1 + \frac{1}{6}C_2 \qquad (20, \text{repeated})$$

$$A_2 = \frac{3}{16}C_1 + \frac{11}{16}C_2 + \frac{1}{8}C_3 \qquad (18, \text{repeated})$$

By symmetry, at the curve's opposite end:

$$A_{N-3} = \frac{1}{8}C_{N-4} + \frac{11}{16}C_{N-3} + \frac{3}{16}C_{N-2} \qquad (21)$$

$$A_{N-2} = \frac{1}{6}C_{N-3} + \frac{1}{2}C_{N-2} + \frac{1}{3}C_{N-1} \qquad (22)$$

$$A_{N-1} = C_{N-1} \qquad (23)$$

Figure 7:
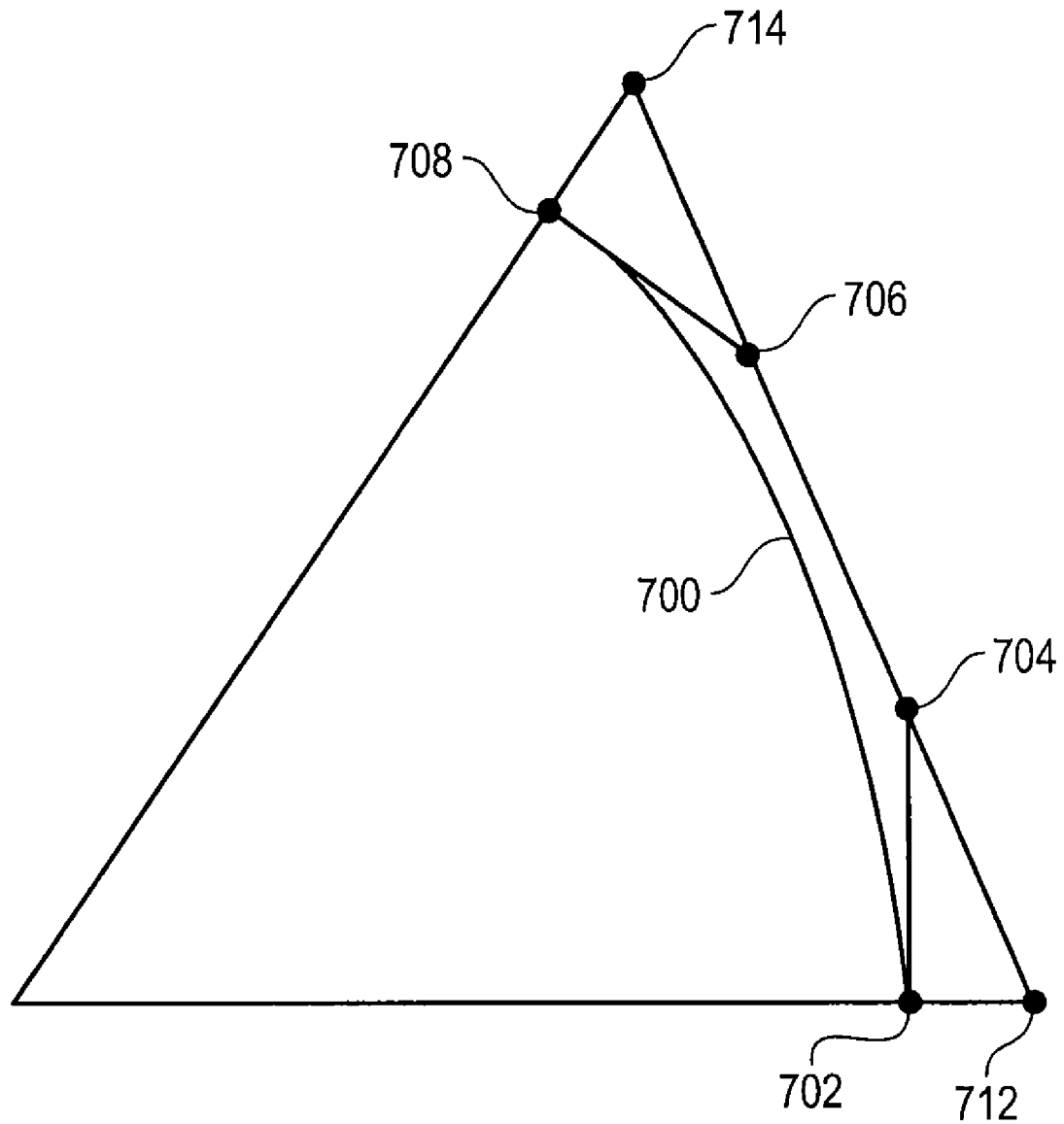
FIG. 7 shows approximation of a B-spline curve with four control vertices.

The case of B-spline curves with four control vertices is now discussed. FIG. 7 shows an end-point interpolating uniform B-spline curve with four control vertices (i.e., N=4) $C_0 \ldots C_3$ (702-708). This B-spline curve shares arc 700 with the free-end cubic B-spline curve represented by successive control vertices $C'_3$, $C_1$ and $C_0$ (714, 704, 702). Given this characteristic, and the approach described above, control vertex $C_3$ may be derived:

$$C'_3 = 2C_2 - C_1 \qquad (24)$$

Once each affine combination ($A_k$) near a B-spline curve's endpoints is determined, each pair of successive affine combinations (i.e., $A_k$ and $A_{k+1}$) is connected with a line segment. The endpoints of the curve are not connected to each other. In this way, line segments approximating portions of the curve near its endpoints is determined. Naturally, these line segments connect to the chain of line segments previously determined for portions of the curve away from the endpoints. In this way, a plurality of line segments approximating the entire B-spline curve is determined.

Substituting equation (24) into equation (20) yields:

$$A_1 = \frac{1}{3}C_0 + \frac{1}{2}C_1 + \frac{1}{6}C'_3 \qquad (25)$$

$$A_1 = \frac{1}{3}C_0 + \frac{1}{3}C_1 + \frac{1}{3}C_2$$

By symmetry, at the curve's opposite end:

$$A_2 = \frac{1}{3}C_1 + \frac{1}{3}C_2 + \frac{1}{3}C_3 \qquad (26)$$

Finally:

$$A_0 = C_0 \qquad (27)$$

$$A_3 = C_3 \qquad (28)$$

Figure 8:
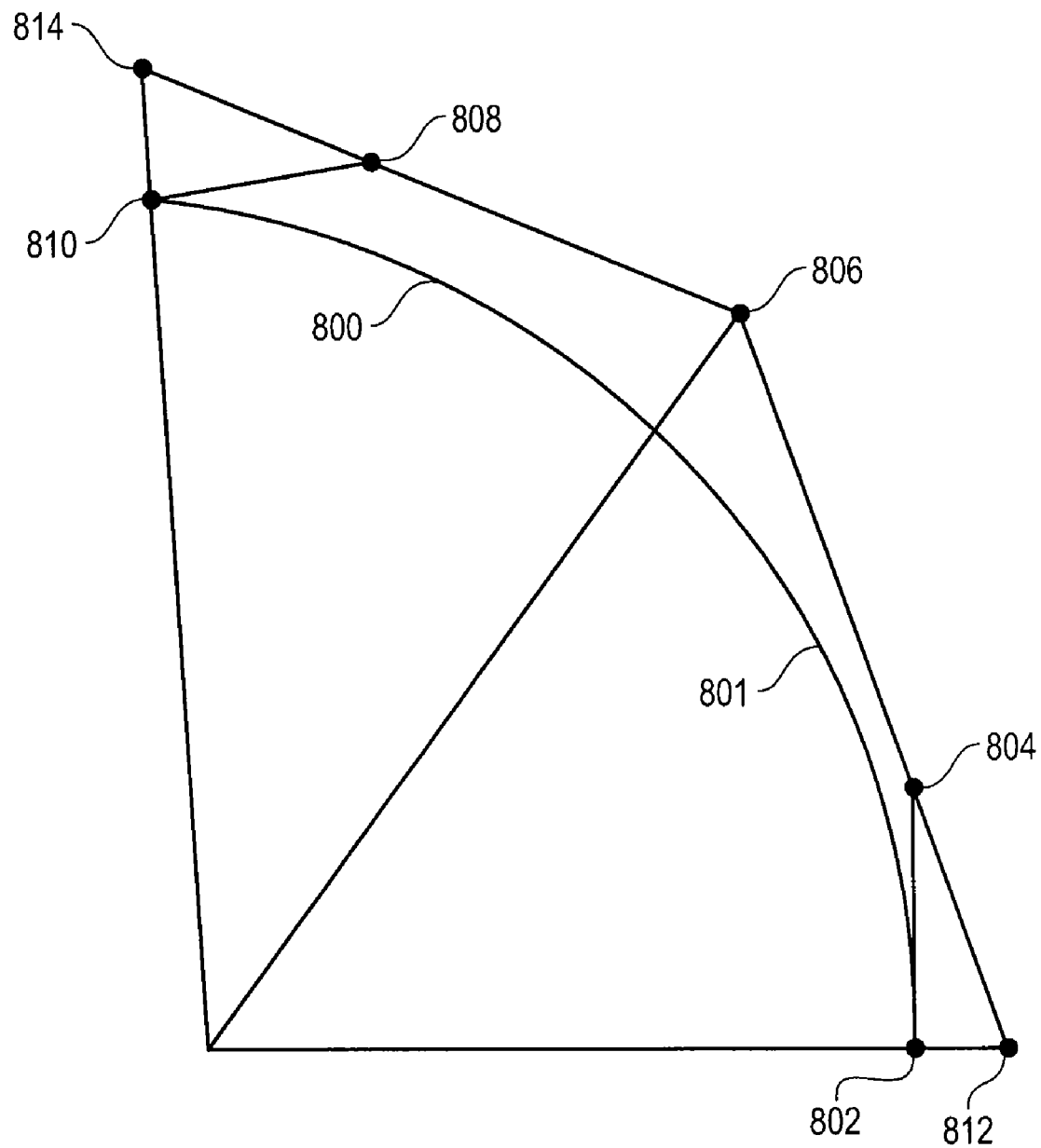
FIG. 8 shows approximation of a B-spline curve with five control vertices.

FIG. 8 shows an end-point interpolating uniform B-spline curve with five control vertices (i.e., N=5) $C_0 \ldots C_4$ (802-810). This B-spline curve shares arc 800 with the free-end cubic B-spline curve represented by successive control vertices $C'_4$, $C_2$, $C_1$ (814, 806, 804). Given this characteristic, control vertex $C'_4$ may be derived:

$$C_3 = \frac{2}{3}C'_4 + \frac{1}{3}C_2 \qquad (29)$$

$$C'_4 = \frac{3}{2}C_3 - \frac{1}{2}C_2$$

Figure 6:
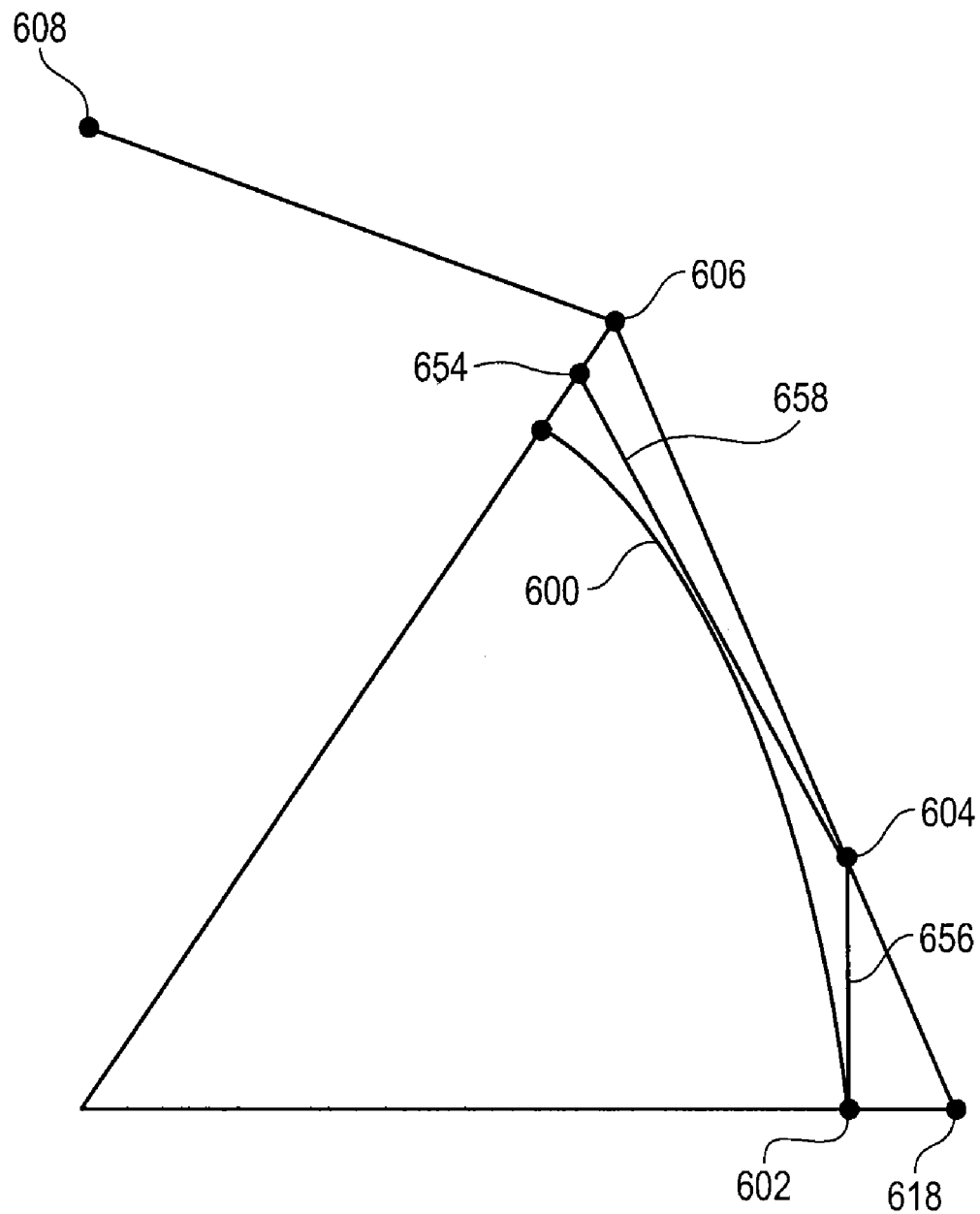
FIG. 6 shows approximation at or near the endpoint of a B-spline curve.

The configuration of control vertices in FIG. 8 is the same as that of FIG. 6, with the exception that $C'_4$ (814) replaces $C_3$ (608). Since equation (27) represents $C'_4$ in terms of $C_3$ and $C_2$, substituting equation (27) into equation (11) yields:

$$A_2 = \frac{3}{16}C_1 + \frac{11}{16}C_2 + \frac{1}{8}C'_4 \qquad (30)$$

$$A_2 = \frac{3}{16}C_1 + \frac{5}{8}C_2 + \frac{3}{16}C_3$$

Thus, we obtain the following affine combinations:

$$A_0 = C_0 \quad (12, \text{repeated})$$

$$A_1 = \frac{1}{3}C_0 + \frac{1}{2}C_1 + \frac{1}{6}C_2 \quad (20, \text{repeated})$$

$$A_2 = \frac{3}{16}C_1 + \frac{5}{8}C_2 + \frac{3}{16}C_3 \quad (30, \text{repeated})$$

By symmetry, at the opposite end of the B-spline curve:

$$A_3 = \frac{1}{6}C_2 + \frac{1}{2}C_3 + \frac{1}{3}C_4 \quad (31)$$

$$A_4 = C_4 \quad (32)$$

For the discussion below, it is helpful to recognize the present approach can be described in linear equation form. Conversion between a line segment representation (A) and a B-spline curve representation (C) of an object (and vice versa) may be represented by the linear equation:

$$A = M_N C \quad (33)$$

where $M_N$ is a matrix of affine coefficients for a curve with N control vertices $M_N$ represents affine coefficients computed using the equations discussed above. Examples of affine coefficient matrices $M_N$ computed using equations discussed above are:

$$M_4 = \begin{bmatrix} 1 & 0 & 0 & 0 \\ \frac{1}{3} & \frac{1}{3} & \frac{1}{3} & 0 \\ 0 & \frac{1}{3} & \frac{1}{3} & \frac{1}{3} \\ 0 & 0 & 0 & 1 \end{bmatrix} \quad (34)$$

$$M_5 = \begin{bmatrix} 1 & 0 & 0 & 0 & 0 \\ \frac{1}{3} & \frac{1}{2} & \frac{1}{6} & 0 & 0 \\ 0 & \frac{3}{16} & \frac{5}{8} & \frac{3}{16} & 0 \\ 0 & 0 & \frac{1}{6} & \frac{1}{2} & \frac{1}{3} \\ 0 & 0 & 0 & 0 & 1 \end{bmatrix} \quad (35)$$

$$M_7 = \begin{bmatrix} 1 & 0 & 0 & 0 & 0 & 0 & 0 \\ \frac{1}{3} & \frac{1}{2} & \frac{1}{6} & 0 & 0 & 0 & 0 \\ 0 & \frac{3}{16} & \frac{11}{16} & \frac{1}{8} & 0 & 0 & 0 \\ 0 & 0 & \frac{1}{8} & \frac{3}{4} & \frac{1}{8} & 0 & 0 \\ 0 & 0 & 0 & \frac{1}{8} & \frac{11}{16} & \frac{3}{16} & 0 \\ 0 & 0 & 0 & 0 & \frac{1}{6} & \frac{1}{2} & \frac{1}{3} \\ 0 & 0 & 0 & 0 & 0 & 0 & 1 \end{bmatrix} \quad (36)$$

Linear equation (33) makes clear that the process of determining an unknown approximation (A) from a known B-spline curve (B) and known affine coefficients ($M_N$) involves basic linear algebra. One skilled in the art will recognize that this calculation is relatively simple, and thus, manageable for a computer enabled animation system even if large numbers of strands are approximated.

Furthermore, equation (33) also represents the conversion of approximated strands back to B-spine curve representations after simulation. In linear algebra, however, it can be computationally intensive to determine an unknown C from a known A and a known $M_N$ using equation (31).

The issue of computational efficiency is addressed, first by recognizing that the present approach allows affine combinations (e.g., matrices (32)-(35)) for a curve to be managed as a tridiagonal matrix ($M_N$). Equation (37) expands upon equation (31) to show the tridiagonal arrangement of affine coefficients $m_{i,k}$ in matrix $M_N$:

$$\begin{bmatrix} m_{00} & m_{01} & & & 0 \\ m_{10} & m_{11} & m_{12} & & \\ & m_{21} & m_{22} & \ldots & \\ & & \ldots & \ldots & m_{N-2,N-1} \\ & & & m_{N-1,N-2} & m_{N-1,N-1} \end{bmatrix} \begin{bmatrix} C_0 \\ C_1 \\ \vdots \\ \vdots \\ C_{N-1} \end{bmatrix} = \begin{bmatrix} A_0 \\ A_1 \\ \vdots \\ \vdots \\ A_{N-1} \end{bmatrix} \quad (37)$$

Methods of solving linear equations with tridiagonal matrices are well documented. Equation (37) may be solved using the well-known tridiagonal matrix algorithm (TDMA). TDMA solves equation (37) for control vertices (C) in a number of operations that is linearly proportional to the size of $M_N$. This performance allows the present approach to function within a computer enabled animation system.

In one embodiment, the present approach provides processes downstream from the dynamics simulator with B-spine curve representations of simulated strands in a linear number of operations. The curve, in B-spline curve representation, is then processed by the rendering module and displayed to the user. One skilled in the art will recognize that the present approach may be used in other parts of a computer enabled animation system, including but not limited to, dynamics simulators.

The present approach is typically implemented in the form of computer software (code) executed on a computer. The computer may be a general-purpose computer including, for example, a processor, memory, storage, and input/output devices (e.g., monitor, keyboard, disk drive, Internet connection, etc.). However, the computer may include circuitry or other specialized hardware for carrying out some or all aspects of the processes. In some operational settings, the apparatus may be configured as a system that includes one or more units, each of which is configured to carry out some aspects of the processes either in software, in hardware or in some combination thereof.

Coding the computer software program, in light of this disclosure, would be routine; a suitable computer language is C++. The software itself would typically be stored in source code or compiled form on a computer readable storage medium, such as a hard disk, disk, tape, flash memory, CD-R, DVD, memory, so forth, for execution by the computer processor. At least some values based on the results of the processes can be saved, either in temporary storage (e.g., memory) or permanent storage (e.g., disk) for later use (e.g., display or further processing).

Figure 10:
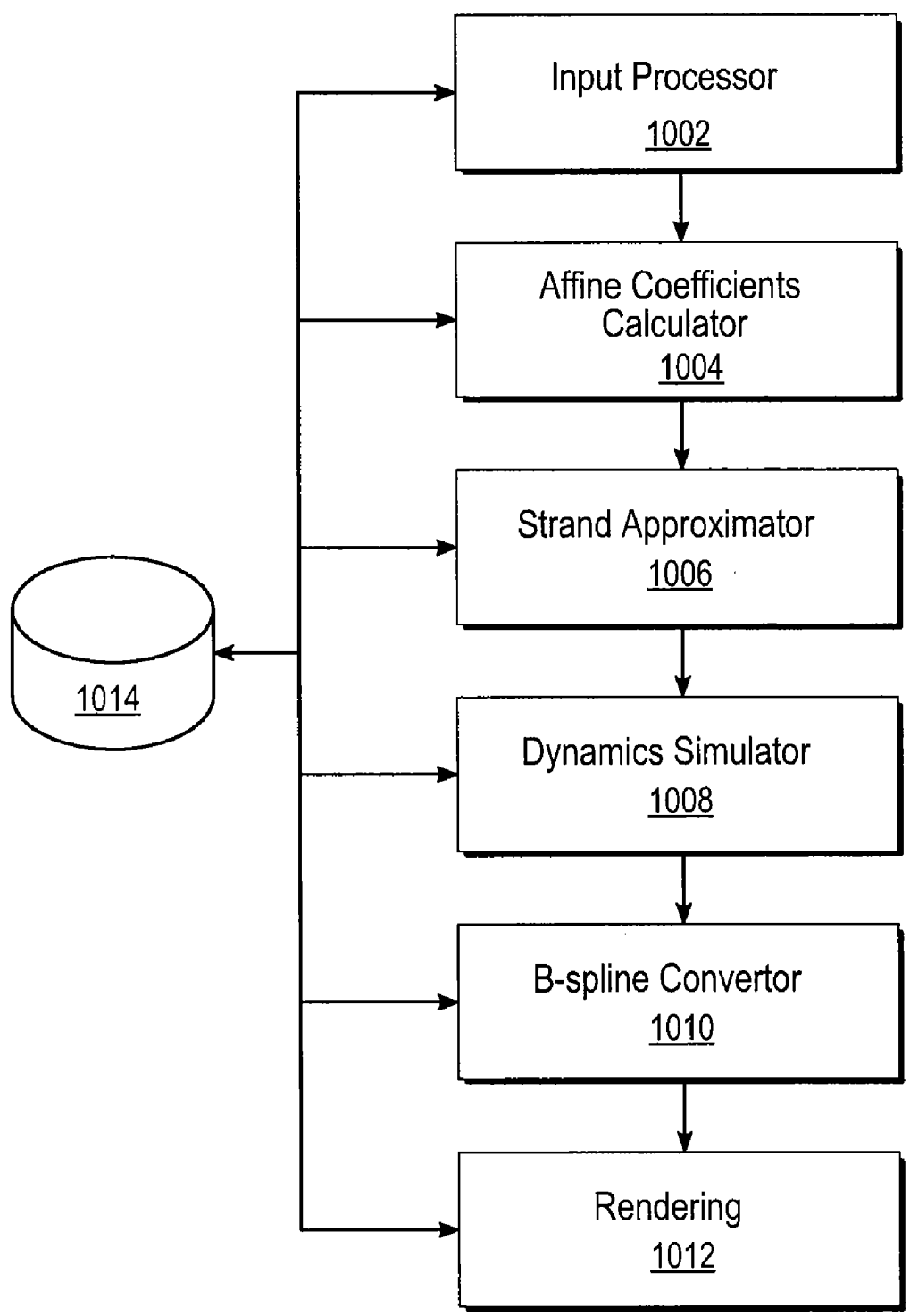
FIG. 10 shows an apparatus operable to perform the current method.

FIG. 10 shows the structure of an apparatus as embodied in a programmed computer operable to carry out the present approach. Each module in FIG. 10 corresponds to a function involved. Input Processor 1002 reads (or creates, as necessary) a strand object's initial state represented by B-spline curve control vertices from data structures stored in temporary or permanent storage (memory) 1014. Affine Coefficients Calculator 1004 determines suitable affine coefficients for approximating the strand and may store them into storage 1014. Strand Approximator 1006 applies linear equation (31) to approximate the strand. The line segment approximation created by the Strand Approximator 1006 may be stored in storage 1014. Dynamics simulator 1008 simulates the line segment approximation and produces simulated line segments. B-spline Converter 1010 determines a set of control vertices to represent the simulated strand from the strand's line segment approximation. The Strand Approximator 1006, Dynamics Simulator module 1008, and B-spline Representation module 1010 may be repeatedly used to process multiple animation frames of a strand. Similarly, the modules may be repeatedly used to process multiple strands. Finally, Rendering module 1012 displays the simulated strands to the animator.

One skilled in the art will recognize that FIG. 10 shows one embodiment of the present approach, but does not require modules to be performed in a specific order, or be performed within the same functional block. For example, the calculation of affine coefficients may be performed at any time before the approximation module 1006 is used. Affine calculations may also be performed within a functional block other than 1004, such as a generic constructor class function for the animation system. The amount of affine calculations performed by module 104 in one instance may also differ. For example, in one embodiment, the Affine Coefficient module 1004 calculates all affine coefficient matrices that will be needed by the Approximation Module to process a predetermined number of strands. In another embodiment, the affine coefficient module 1004 calculates affine coefficients for one strand at a time, and repeat as necessary for different strands.

Furthermore, the use of storage 1014 by different modules may differ. One skilled in the art will recognize that the usage of computer storage during processing also affects performance and scalability. As such, usage strategies are likely to be implementation and/or data specific.

This disclosure is illustrative and not limiting; further modification will be apparent to those skilled in the art in light of this disclosure. Accordingly, all such modifications are intended to be included within the scope of this invention. Figures provided with this disclosure are meant to be illustrative, and may focus on specific features of the preset approach. They may be not drawn to scale.

What is claimed as new and desired to be protected by Letters Patent of the United States is:

1. A computer-implemented method for depicting freeform curves comprising the acts of:
   receiving a plurality of data structures associated with a first curve, wherein the first curve is a freeform curve;
   computing, using a processor, a first plurality of line segments to approximate the first curve by evaluating an affine combination, wherein a plurality of the computed first line segments are approximately equal in length to their respective portions of the first curve;
   providing the computed first line segments to an animation process, wherein the computed first line segments are to be animated by the animation process;
   receiving a second plurality of line segments from the animation process, wherein the second plurality of line segments is based on the computed first line segment and the animation process;
   computing, using the processor, a second curve to approximate the second plurality of line segments by solving a linear system of equations,
   wherein the second curve is a freeform curve,
   wherein a plurality of segments of the computed second curve are approximately equal in length to their respective line segments, and
   wherein the linear system of equations comprises a tridiagonal matrix defined by the affine combination; and
   causing a display of the computed second curve.

2. The method of claim 1, wherein the plurality of data structures corresponds to a first plurality of control vertices associated with the first curve.

3. The method of claim 2, wherein each control vertex is defined as a plurality of points in affine space.

4. The method of claim 2, wherein each control vertex is defined as a plurality of vectors.

5. The method of claim 1, wherein the first curve is an uniform B-spline curve.

6. The method of claim 1, wherein the animation process involves dynamics simulation of the computed first line segments.

7. The method of claim 1, wherein the computed second curve is an uniform B-spline curve.

8. The method of claim 7, wherein the computed second curve is associated with a second plurality of control vertices.

9. The method of claim 8, wherein each control vertex is defined as a plurality of vectors.

10. The method of claim 8, wherein each control vertex is defined as a plurality of points in an affine space.

11. The method of claim 1,
    wherein the first curve is an uniform B-spline curve,
    wherein the plurality of data structures corresponds to a first plurality of control vertices associated with the first curve,
    wherein the computing of the first plurality of line segments comprises evaluating the affine combination based on the first plurality of control vertices, and
    wherein the total number of line segments in the first plurality of line segments is based on the total number of data structures in the plurality of data structures.

12. The computer-implemented method of claim 11, wherein the first curve is associated with a strand of hair of a computer-animated character.

13. A non-transitory computer-readable storage medium comprising instructions configured to be executed at a computer and to cause the computer to depict freeform curves, the instructions comprising:
    receiving a plurality of data structures associated with a first curve, wherein the first curve is a freeform curve;
    computing a first plurality of line segments to approximate the first curve by evaluating an affine combination, wherein a plurality of the computed first line segments are approximately equal in length to their respective portions of the first curve;
    providing the computed first line segments to an animation process, wherein the computed first line segments is to be animated by the animation process;
    receiving a second plurality of line segments from the animation process, wherein the second plurality of line segments is based on the computed first line segment and the animation process;
    computing a second curve to approximate the second plurality of line segments by solving a linear system of equations,
    wherein the second curve is a freeform curve,
    wherein a plurality of segments of the computed second curve are approximately equal in length to their respective line segments, and
    wherein the linear system of equations comprises a tridiagonal matrix defined by the affine combination; and causing a display of the computed second curve.

14. The computer-readable storage medium of claim 13, wherein the first curve is an uniform B-spline curve,
wherein the plurality of data structures corresponds to a first plurality of control vertices associated with the first curve,
wherein the computing of the first plurality of line segments comprises evaluating the affine combination based on the first plurality of control vertices, and
wherein the total number of line segments in the first plurality of line segments is based on the total number of data structures in the plurality of data structures.

15. The computer-readable storage medium of claim 14, wherein the first curve is associated with a strand of hair of a computer-animated character.

16. An animation system for depicting freeform curves, comprising:
a memory for storing a plurality of data structures, wherein at least a subset of the plurality of data structures is associated with a freeform curve;
an input processor coupled to the memory, and which calculates a first B-spline curve from the freeform curve;
an affine coefficient calculator connected to the memory and the input processor, and which calculates a plurality of affine coefficients for approximating the first B-spline curve;
a strand approximator coupled to the memory and the affine coefficient calculator, and which computes a first plurality of line segments to approximate the first B-spline curve,
wherein the first plurality of line segments are approximately equal in length to their respective portions of the first B-spline curve,
wherein the computing a first plurality of line segments comprises evaluating the plurality of affine coefficients;
a dynamics simulator coupled to the memory and the strand approximator, and which changes each first plurality of line segments each into a second plurality of line segments;
a B-spline converter coupled to the memory and the dynamics simulator, and which computes a second B-spline curve to approximate the second plurality of line segments by solving a linear system of equations,
wherein the linear system of equations comprises a tridiagonal matrix defined by the plurality of affine coefficients; and
a rendering component coupled to the memory, the B-spline converter, and which depicts the computed second B-spline curve.

17. The system of claim 16, wherein:
the first curve is an uniform B-spline curve,
the subset of data structures corresponds to a first plurality of control vertices associated with the first curve,
wherein the computing of the first plurality of line segments comprises evaluating the affine combination based on the first plurality of control vertices, and
wherein the total number of line segments in the first plurality of line segments is based on the total number of data structures in the plurality of data structures.

18. The system of claim 17, wherein the first B-spline curve is associated with a strand of hair of a computer-animated character.

* * * * *

UNITED STATES PATENT AND TRADEMARK OFFICE
CERTIFICATE OF CORRECTION

Figure 1A:
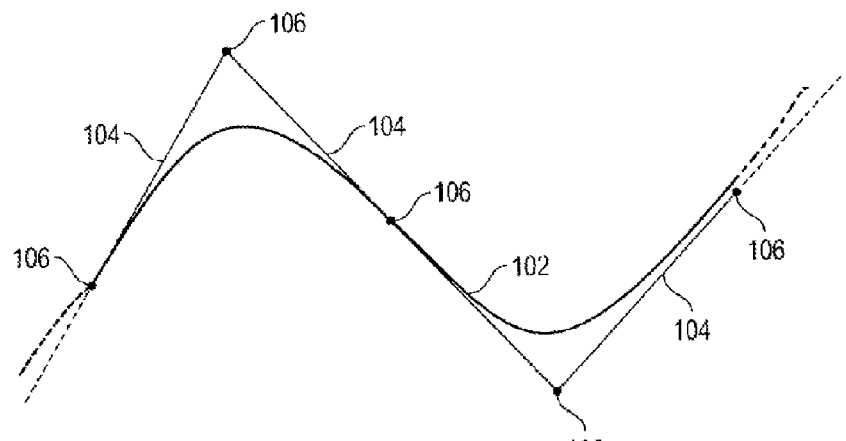
FIGS. 1A-B show related art.
Figure 1B:
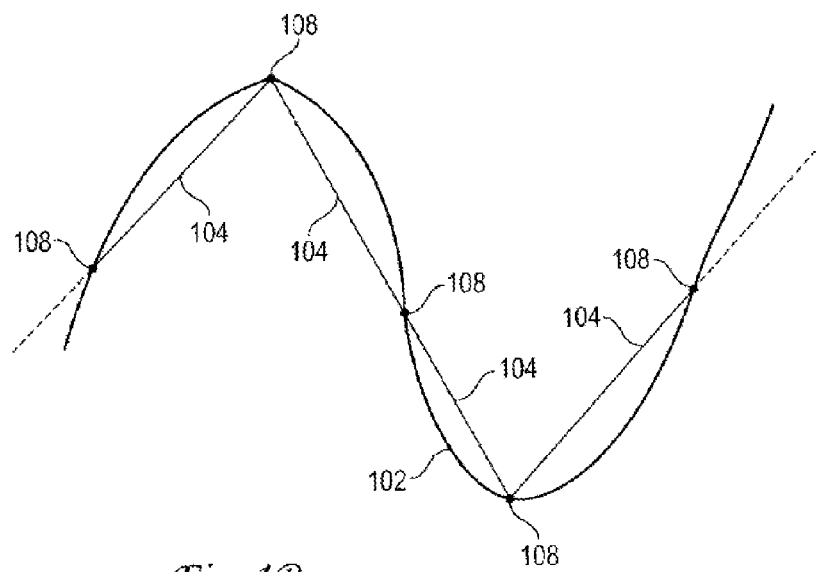

PATENT NO. : 8,305,378 B2
APPLICATION NO. : 12/196172
DATED : November 6, 2012
INVENTOR(S) : Silviu Borac It is certified that error appears in the above-identified patent and that said Letters Patent is hereby corrected as shown below:

IN THE SPECIFICATIONS:

In column 2, line 23, Delete "FIGS. 1A-B" and insert -- FIGS. 1A-1B --, therefor.

In column 3, line 29, Delete "$a_{k+1}=1$" and insert -- $\alpha_{k+1}=1$ --, therefor.

In column 5, line 65, Delete "$C_0$" and insert -- $C'_0$ --, therefor.

In column 6, line 55, Delete "A1." and insert -- $A_1$. --, therefor.

In column 8, line 6, Delete "$C_3$" and insert -- $C'_3$ --, therefor.

In column 9, line 27, Delete "vertices" and insert -- vertices. --, therefor.

Signed and Sealed this
Twelfth Day of March, 2013

Teresa Stanek Rea
*Acting Director of the United States Patent and Trademark Office*